United States Patent
Kim et al.

(10) Patent No.: US 8,855,429 B2
(45) Date of Patent: *Oct. 7, 2014

(54) METHOD AND APPARATUS FOR RECOGNIZING CHARACTERS

(71) Applicant: Samsung Electronics Co., Ltd., Gyeonggi-do (KR)

(72) Inventors: Hyun-Soo Kim, Gyeonggi-do (KR); Seong-Taek Hwang, Gyeonggi-do (KR); Sang-Wook Oh, Gyeonggi-do (KR); Sang-Ho Kim, Gyeonggi-do (KR); Yun-Je Oh, Gyeonggi-do (KR); Hee-Won Jung, Gyeonggi-do (KR); Sung-Cheol Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/018,005

(22) Filed: Sep. 4, 2013

(65) Prior Publication Data

US 2014/0003726 A1    Jan. 2, 2014

Related U.S. Application Data

(63) Continuation of application No. 13/658,319, filed on Oct. 23, 2012, now Pat. No. 8,553,987, which is a continuation of application No. 12/487,378, filed on Jun. 18, 2009, now Pat. No. 8,320,681.

(30) Foreign Application Priority Data

Jun. 19, 2008  (KR) .................. 10-2008-0058069
Dec. 4, 2008   (KR) .................. 10-2008-0122637

(51) Int. Cl.
*G06K 9/62*  (2006.01)
*G06K 9/22*  (2006.01)
*G06K 9/78*  (2006.01)
*G06K 9/72*  (2006.01)
*G06K 9/32*  (2006.01)

(52) U.S. Cl.
CPC ..... *G06K 9/78* (2013.01); *G06K 9/228* (2013.01); *G06K 9/723* (2013.01); *G06K 9/325* (2013.01)
USPC .......................................... 382/209

(58) Field of Classification Search
None
See application file for complete search history.

(56) References Cited

U.S. PATENT DOCUMENTS

| | | | |
|---|---|---|---|
| 5,684,891 A * | 11/1997 | Tanaka et al. | 382/178 |
| 5,949,481 A | 9/1999 | Sekine et al. | |
| 6,731,788 B1 * | 5/2004 | Agnihotri et al. | 382/157 |
| 2006/0215937 A1 | 9/2006 | Snapp | |

(Continued)

FOREIGN PATENT DOCUMENTS

| | | |
|---|---|---|
| CN | 1755708 | 4/2006 |
| CN | 101015201 | 8/2007 |

(Continued)

*Primary Examiner* — Nirav G Patel
(74) *Attorney, Agent, or Firm* — Jefferson IP Law, LLP

(57) ABSTRACT

A method and an apparatus for recognizing characters using an image are provided. A camera is activated according to a character recognition request and a preview mode is set for displaying an image photographed through the camera in real time. An auto focus of the camera is controlled and an image having a predetermined level of clarity is obtained for character recognition from the images obtained in the preview mode. The image for character recognition is character-recognition-processed so as to extract recognition result data. A final recognition character row is drawn that excludes non-character data from the recognition result data. A first word is combined including at least one character of the final recognition character row and a predetermined maximum number of characters. A dictionary database that stores dictionary information on various languages using the first word is searched, so as to provide the user with the corresponding word.

20 Claims, 9 Drawing Sheets

(56) References Cited

U.S. PATENT DOCUMENTS

2007/0266312 A1 11/2007 Ayaki et al.
2013/0022284 A1 1/2013 Zheng

FOREIGN PATENT DOCUMENTS

| CN | 101072301 | 11/2007 |
| EP | 1 855 464 | 11/2007 |
| EP | 1855464 A2 * | 11/2007 |
| JP | 2005215775 | 8/2005 |
| KR | 1020030094708 | 12/2003 |
| KR | 1020060065197 | 6/2006 |
| WO | WO 2006/025691 | 3/2006 |
| WO | WO 2006025691 A1 * | 3/2006 |

* cited by examiner

METHOD AND APPARATUS FOR RECOGNIZING CHARACTERS

PRIORITY

This application is a Continuation Application of U.S. patent application Ser. No. 13/658,319, which was filed in the U.S. Patent and Trademark Office on Oct. 23, 2012, which is a Continuation Application of U.S. Pat. No. 8,320,681, which issued on Nov. 27, 2012, and claims priority under 35 U.S.C. §119(a) to Korean Patent Applications entitled "Method and Apparatus for Recognizing Characters" filed in the Korean Intellectual Property Office on Jun. 19, 2008 and Dec. 4, 2008, and assigned Serial Nos. 10-2008-0058069 and 10-2008-0122637, the contents of each of which are incorporated herein by reference.

BACKGROUND OF THE INVENTION

1. Field of the Invention

The present invention relates generally to a method and an apparatus for recognizing characters, and more particularly, to a method and an apparatus for recognizing characters using a camera.

2. Description of the Related Art

As electronic technology has developed, portable terminals, such as mobile communication terminals, Personal Digital Assistants (PDAs), and portable game devices, have been incorporated with various functions in addition to their one or two exclusive functions. For example, in addition to a device required for a communication function, mobile communication terminals may also include a digital camera or a music file reproducing device, so as to provide the user with a photographing function or a music reproducing function. Further, such added devices are linked with other applications, so as to provide various functions. For example, portable terminals including a camera may also provide a character recognition function using a still image when linked with a character recognition application.

Generally, a portable terminal including a camera generates and stores a still image for character recognition, and a character recognition application then reads the stored still image so as to perform character recognition. The recognized result can be used in another application. Specifically, character recognition may be used to omit complicated processes, such as character key input by the user. Character recognition may also be used to input a character that cannot be input through the keys included in the portable terminal, or to input characters of which the user is not aware.

However, the conventional character recognition method fails to rapidly recognize consecutive words in real time because the user presses a shutter to take a picture of a character, obtains a still image from the photographed result, and then performs character recognition processing. In this respect, if there are many characters to be recognized, a method for efficiently and rapidly performing the character recognition and providing the recognition result is needed.

SUMMARY OF THE INVENTION

The present invention has been made to address at least the above problems and/or disadvantages and to provide at least the advantages described below. Accordingly, an aspect of the present invention provides a method and an apparatus for recognizing characters, which rapidly recognizes a plurality of characters in real time and provides the user with the recognized result when the user recognizes the characters using a camera.

According to one aspect of the present invention, a method is provided for recognizing a character in a character recognizing apparatus. A camera is activated in accordance with a character recognition request and a preview mode is set for displaying one or more images photographed through the camera in real time. An auto focus of the camera is controlled and an image having a predetermined level of clarity is obtained for character recognition from the images obtained in the preview mode as an image. The image for character recognition is character-recognition-processed so as to extract recognition result data. A final recognition character row is drawn that excludes non-character data from the recognition result data.

The method for recognizing a character may further include activating the camera in accordance with the character recognition request and setting a preview mode that displays one or more images photographed through the camera in real time, detecting a character from the image for character recognition, and obtaining the preview image first displayed through the preview mode if no character exists or detecting if movement of the character recognizing apparatus by the user exists if a character exists.

The method for recognizing a character may further include obtaining the preview image first displayed through the preview mode if movement of the character recognizing apparatus exists, and controlling an auto focus of the camera if no movement exists and obtaining an image having a predetermined level of clarity from the images obtained in the preview mode as an image for character recognition.

The method for recognizing a character may further include combining a first word including the character of the final recognition character row and the predetermined maximum number of characters and searching dictionary database storing dictionary information on various languages using the first word, so as to provide the user with the corresponding word.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE PREFERRED EMBODIMENT

Figure 1:
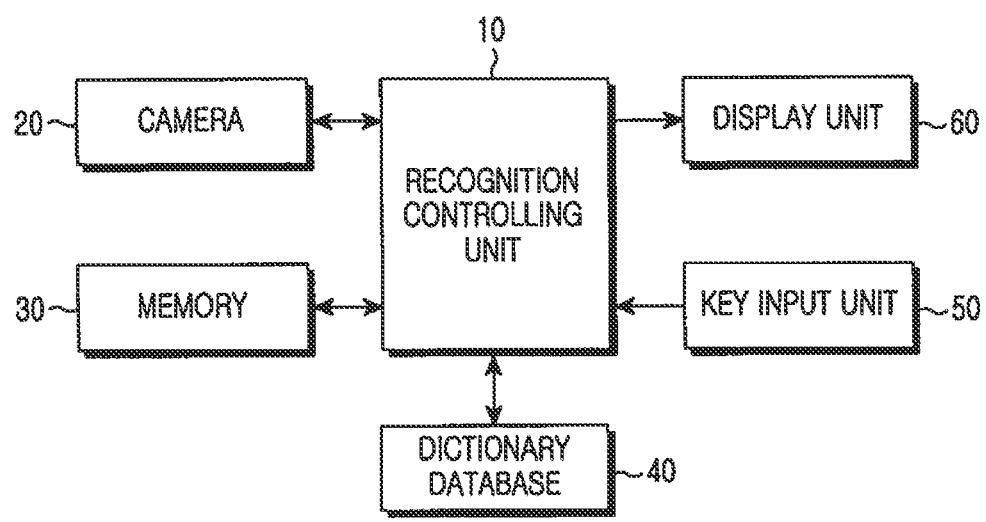
FIG. 1 is a diagram illustrating the construction of a character recognizing apparatus according to an embodiment of the present invention.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject manner of the present invention.

The construction of a character recognizing apparatus of the present invention is described with reference to FIG. 1. The character recognizing apparatus according to the present invention can be mounted on a portable terminal, such as a mobile communication terminal or Portable Media Player (PMP). As shown in FIG. 1, the character recognizing apparatus includes a recognition controlling unit 10, a camera 20, a memory 30, a dictionary database 40, a display unit 60, and a key input unit 50.

The camera 20 converts an analog image of a subject received through an object lens and a finder into digital information using a solid-state image capturing device, or the like, according to the control of the recognition controlling unit 10, so as to store the converted information in the memory 30.

The display unit 60 displays various images and data information stored in the memory 30 on a screen under the control of the recognition controlling unit 10. When a camera function is activated, the camera 20 is operated so as to execute a preview mode that displays an image captured through the lens on the screen of the display unit 60 in real time. When the user presses a photo button in a state where a desired subject is displayed on a Liquid Crystal Display (LCD) of the display unit 60, the image is captured through the lens of the camera 20, and the captured image is compressed, to be stored in the memory 30. Further, the display unit 60 displays the character recognition result, character recognition state, or the like.

The key input unit 50 includes number keys, directional keys, or function keys corresponding to various functions of the character recognizing apparatus and provides the recognition controlling unit 10 with key input data corresponding to the key pressed by the user.

The dictionary database 40 stores dictionary information corresponding to various languages.

The memory 30 stores programs for processing and controlling the recognition controlling unit 10, reference data, various renewable data storage data, or the like, which are provided to the working memory of the recognition controlling unit 10. Further, the memory 30 stores image data generated by the camera 20.

The recognition controlling unit 10 controls various operations of the character recognizing apparatus, processes the data, recognizes the characters according to the present invention, searches the dictionary database 40 using the recognized characters, and provides the user with the search result.

Figure 2:
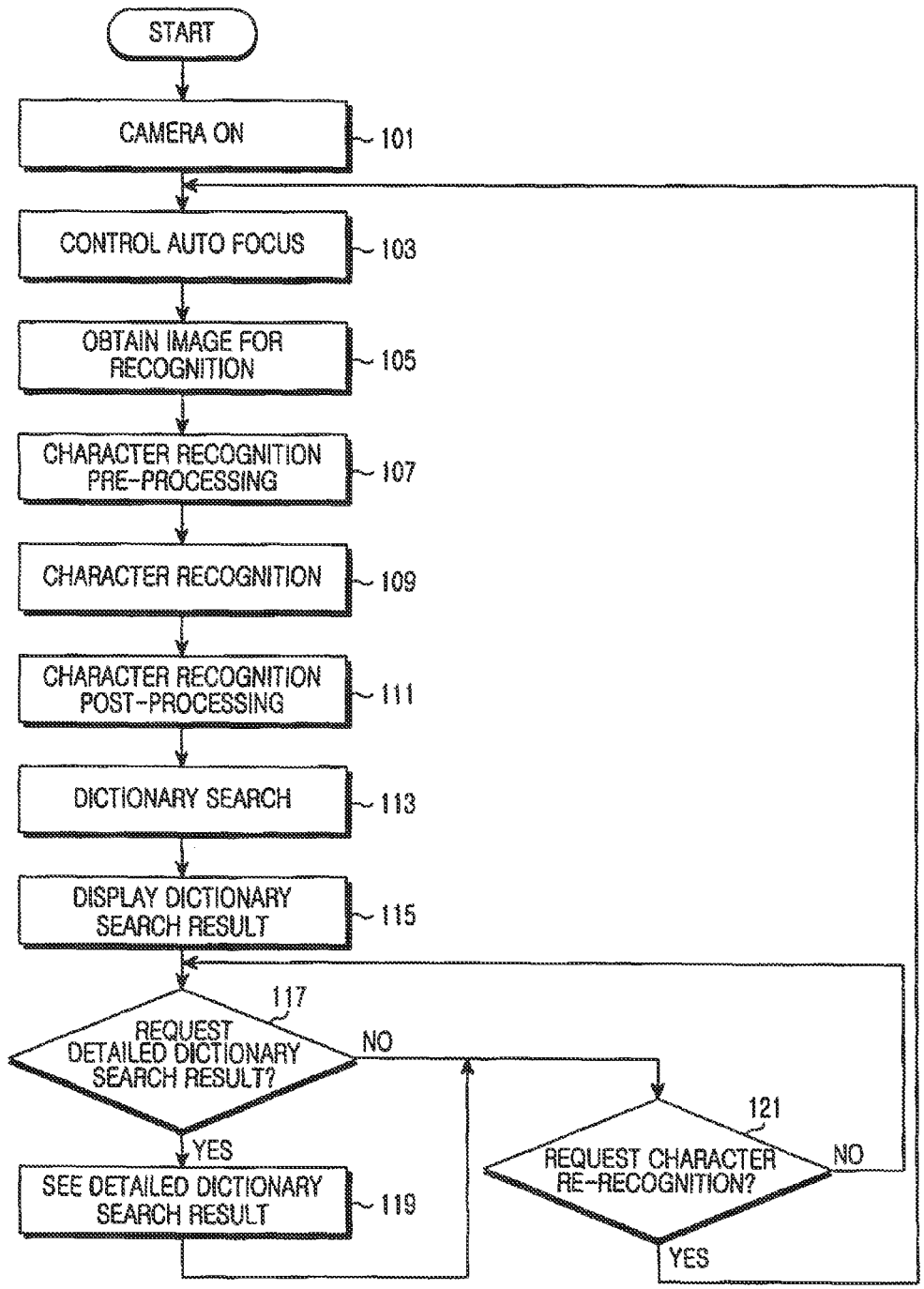
FIG. 2 is a flowchart illustrating an operation procedure of a character recognizing apparatus according to an embodiment of the present invention.

The operation of the recognition controlling unit 10 is described with reference to FIG. 2. FIG. 2 illustrates the operation of the recognition controlling unit 10 according to an embodiment of the present invention.

Referring to FIG. 2, if the user requests character recognition, the recognition controlling unit 10 activates the camera 20 in step 101, sets a preview mode, and displays the image photographed through the camera 20 on the display unit 60 in real time. The recognition controlling unit 10 indicates an input start point on the screen. The input start point helps to increase character recognition rate and represents a location of the character for recognition on the screen. When the preview mode is set and an image is displayed on the display unit 60, the user points the lens of the camera 20 to the character. The user can adjust the location of the camera 20 so that the character is on the input start point.

In the above procedures, the camera 20 is moved by the user so that the distance between the camera 20 and the subject character may be changed, causing a loss of focus, and a blur in the image. The blur refers to a phenomenon in which the outlines of the subjects in the image are blurred. It may be impossible to recognize characters in an image with the serious blur, and a clear image having a certain level must be obtained. Therefore, the recognition controlling unit 10 in the present invention controls the auto focus that detects the blur of the image input in real time and automatically adjusts the focus in step 103.

Figure 3:
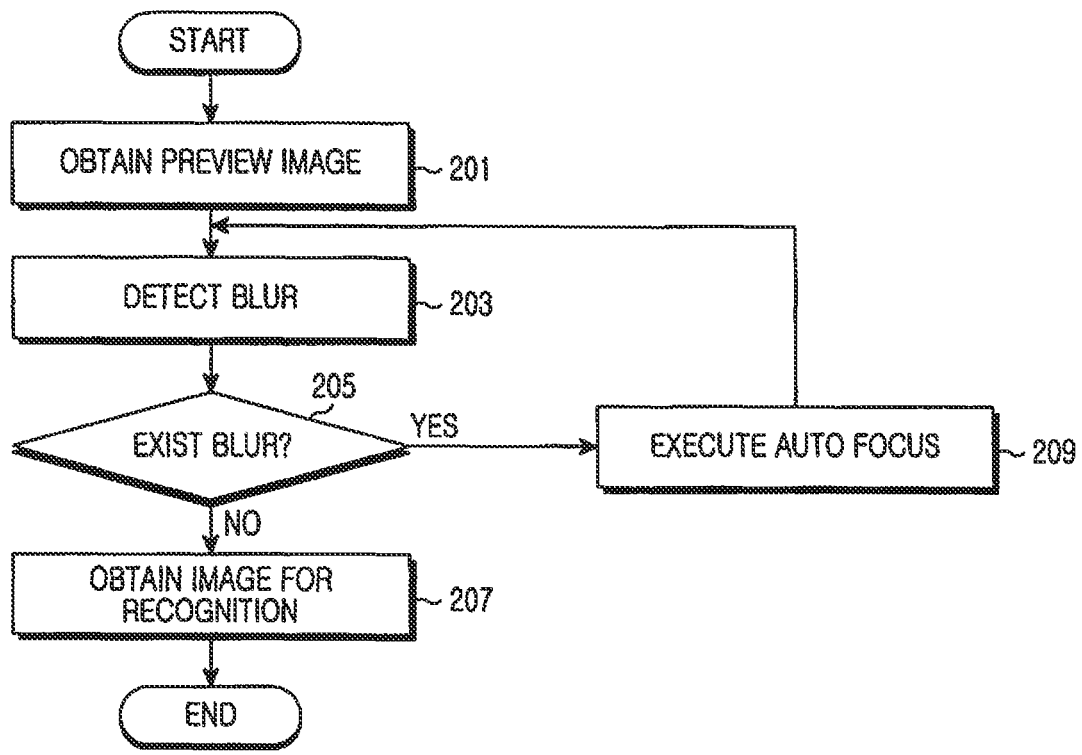
FIG. 3 is a flowchart illustrating a procedure of controlling the auto focus function of a character recognizing apparatus according to an embodiment of the present invention.

The control of the auto focus is illustrated in FIG. 3. The recognition controlling unit 10 obtains the preview image in step 201 and detects the blur in step 203. The recognition controlling unit 10 identifies if the blur is present in the preview image in step 205 and executes the auto focus in step 209 if the blur is present. However, if the blur is not present, the recognition controlling unit 10 obtains the preview image as the image for character recognition in step 207.

In using the blur detecting method, if the outlines of the subjects of the current image are not as clear as a predetermined reference value, the recognition controlling unit 10 determines that the blur is generated and the focal distance of the current image is incomplete. The recognition controlling unit 10 then controls the camera 20 so as to execute the auto focusing. If the outline of the subject included in the current image is as clear as or more clear than the predetermined reference value according to the blur detecting result, i.e., having a clarity with a value greater than or equal to the reference value, the image is obtained as the image for recognition. As the recognition controlling unit 10 conditionally executes the auto focusing through the auto focus control, it can rapidly obtain an image for recognition. Contrary to the conventional character recognition in which the specific still image is stored, the stored still image is read, and then the read still image is used as the still image for recognition, the preview image without blur obtained from the preview mode is used for the recognition, in the present invention, so as to decrease the processing time of the character recognition.

Returning to FIG. 2, the image for recognition is obtained through the above procedures in step 105 and the recognition controlling unit 10 performs the character recognition pre-processing in step 107. In the character recognition pre-processing, the recognition controlling unit 10 adjusts the brightness or light intensity of the image, or adjusts the outlines to be clear for increasing the recognition rate in the currently-obtained image for recognition. Then, the recognition controlling unit 10 extracts a Region Of Interest (ROI) including the character.

The recognition controlling unit 10 recognizes the characters using the pre-processed image in which the character recognition pre-processing has been completed in step 109, and performs a character recognition post-processing in step 111. The character recognition post-processing is a kind of pre-processing for the dictionary search, which removes recognition results capable of being incurred due to misrecognition. For example, in recognizing 'Korea XXX' (where X is not a character, is a different language, symbol, or special character in the input image, the extraction of a character code (i.e. a code serving as a result obtained through recognizing an image by a recognizing apparatus, e.g. arrangement of ASCII) determining that the actual character is accurately recognized from the recognized result is required. Further, the recognition controlling unit 10 considers characteristics of the respective languages for the recognized characters, to process them, making it possible to obtain the dictionary search result far more rapidly and accurately.

Because the transformation of words in Korean is very complicated, if processing for morpheme analysis or transformation has not been made, it is difficult to obtain an accurate dictionary search result. For example, for the word 'sylphic', the dictionary generally includes only 'sylph' or 'sylphid'. Even though the recognizer accurately recognizes 'sylphic', the general dictionary does not include every single formation of the word, so that searching the desired word fails. Further, for the word 'outputted', it is possible to obtain a speedy result when only 'output' is searched in the dictionary. Thus, a unique grammar rule based on the language should be applied so as to convert the word enabling a rapid and accurate dictionary search. Further, if there is data incapable of being recognized as a number or a language among the recognized result data extracted from the pre-processing image, the null data is removed. An example of the null data includes a specific symbol, space, etc., and the type or pattern of the null data is previously stored in the memory 30. For example, if the recognized result is 'fan~tastic!!', the specific symbols of "~" and "! !" are removed in such a manner that the character is reconstructed as "fantastic". Through these procedures, it is possible to obtain the accurate characters for the search.

Referring back to FIG. 2, the recognition controlling unit 10 searches the dictionary database 40 using the character recognition post-processing completed-final recognized character or the combination of the characters in step 113 so as to display the dictionary search result on the display unit 60 in step 115. Accordingly, the character row recognized as the word existing in the dictionary can be provided.

According to an embodiment of the present invention, the recognition controlling unit 10 combines the final recognized character row into a first word that includes the maximum number of characters, and searches the dictionary database 40 using the combined word. An arrangement sequence of the characters included in the word is not changed without the request of the user. Further, if there is no corresponding word as a result of a search of the dictionary database 40, the recognition controlling unit 10 searches the dictionary database 40 using a second word in which one character is removed in the first word. The recognition controlling unit 10 continuously searches the dictionary database 40 using the word in which one character is continuously removed until the corresponding word is found. The dictionary search is continued until only one character remains, i.e. the word including one character is searched, and every search result can be provided to the user. The sequence of removing the character is predetermined. Further, the sequence of removing characters or the maximum number of characters of the maximum search word can be set by the user.

For example, if the number of recognized characters is 4 and the maximum number of characters of the search word is set as 4, the word including 4 characters is first searched. If there is no search result, the search is performed while decreasing the number of characters one by one. That is, if the recognized result is 'A', 'B', 'C', 'D' from a beginning position and the maximum number of characters of the search word is 4, the search is performed with ABCD, ABC, AB, and A in sequence. If a search result is output during the search, the search can be interrupted.

Figure 4:
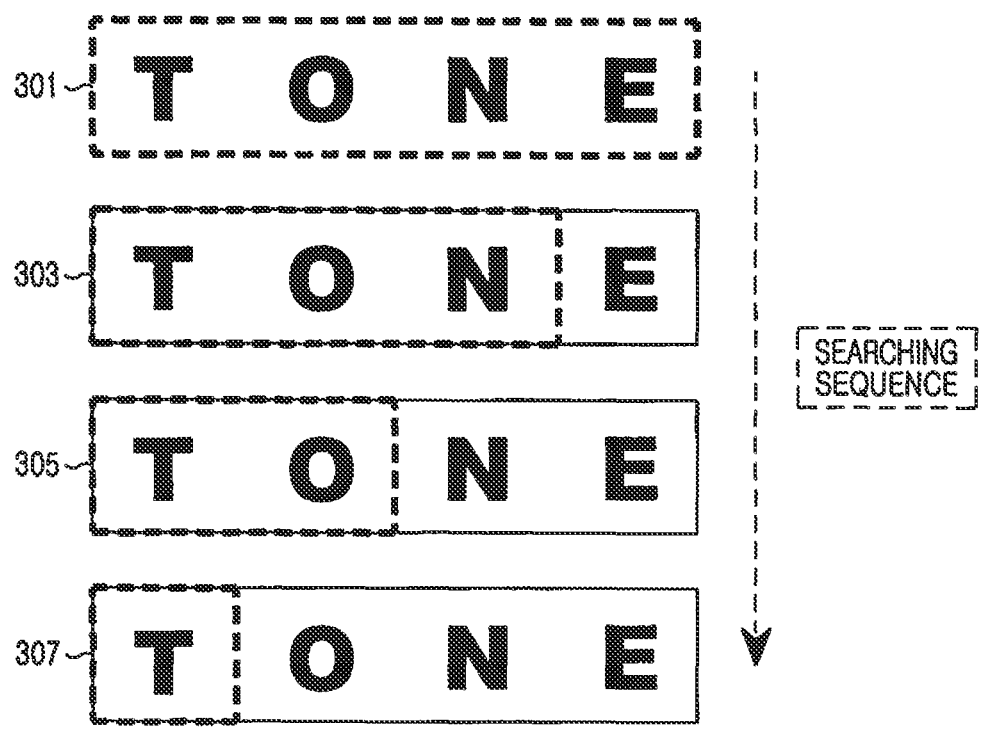
FIG. 4 is a diagram illustrating a dictionary searching procedure according to an embodiment of the present invention.

As shown in FIG. 4, if the recognized character row is "TONE", the maximum number of characters is 4, and it is set to provide every search result, "TONE" is searched in the first search 301, "TON" is searched in the second search 303, "TO" is searched in the third search 305, and "T" is searched in the fourth search 307.

Figure 5:
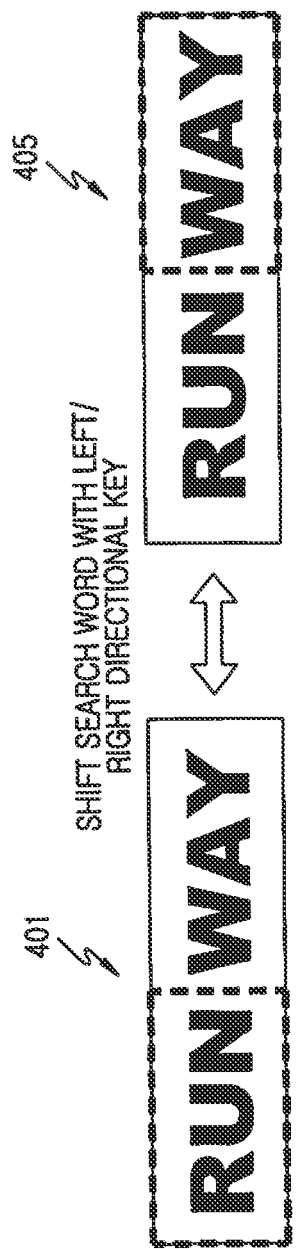
FIG. 5 is a diagram illustrating a dictionary searching procedure according to another embodiment of the present invention.

The recognized word or other word or character around the character can already exist in the recognized result. Therefore, in order to avoid the process of re-recognizing the neighboring word or character, the right and left key based on the word or character can be shifted so that the dictionary search can be selectively performed among the currently recognized character row. For example, if the key input of selecting a part of the character row is received from the user in a state where the final recognized character row obtained in step 111 is displayed on the display unit 60, the recognition controlling unit 10 can select the character corresponding to the key input and search the word including the selected character. As shown in FIG. 5, in a state where the "RUNWAY" is displayed, the user can select only the front part "RUN" by inputting the left/right directional key in step 401 or select only the rear part "WAY". Accordingly, the recognition controlling unit 10 performs the dictionary search with respect to the selected word.

Returning to FIG. 2, if the user requests to see the currently displayed dictionary search result in more detail in step 117, the recognition controlling unit 10 proceeds to step 119 so as to provide the detailed dictionary information. Further, if the user requests to re-recognize the character, the recognition controlling unit 10 returns to step 103 so as to repeatedly perform the above steps.

The afore mentioned character recognizing procedure of the present invention describes a series of procedures when the user places the character recognizing apparatus on the character to be recognized. However, when the user moves to recognize another character with the character recognizing apparatus, the auto focus and character recognizing procedure of the camera are executed and the undesired result is displayed, causing unnecessary execution of a camera's auto focus control and recognition. This causes the frame rate of the input image of the camera to decrease due to the power consumption and calculation amount so a camera preview interruption phenomenon, etc., occurs when the user moves with the camera.

Figure 6:
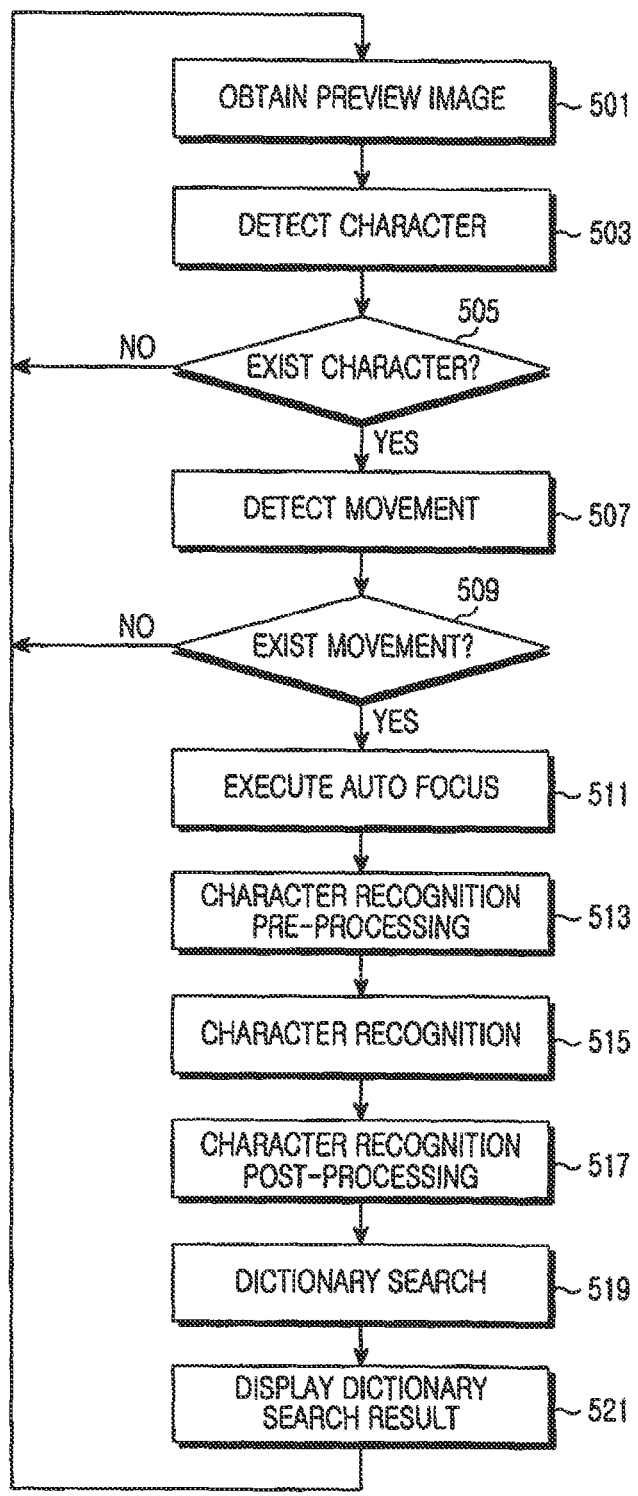
FIG. 6 is a flowchart illustrating an operation procedure of a character recognizing apparatus according to another embodiment of the present invention.

In order to control the afore-mentioned basic operation sequences, according to another embodiment shown in FIG. 6, the preview image is obtained in step 501, and the character is detected for determining if the character exists in the currently input image in step 503, so as to determine the existence of the character according to the result in step 505. If the character exists, movement is detected for determining if the user shifts the camera through comparing the currently input image and the previous image in step 507 so as to determine the existence of movement in step 509. If there is no movement, i.e., only when the user places the camera on the character to be recognized, the auto focusing and recognition are executed in steps 511, 513, 515, 517, 519, and 521 in a manner similar to that of FIG. 2. If it is determined that no character exists or movement exists, step 501 of obtaining a camera preview image is executed again.

In the above embodiment, a case is provided in which the existence of a character is determined and movement is also detected. However, depending on the embodiment of the present invention, it can be constructed such that only the existence of a character is determined and then the auto focusing and recognizing procedure are executed according to the result, or the auto focusing and recognizing procedure are executed only where movement is not detected.

Figure 7:
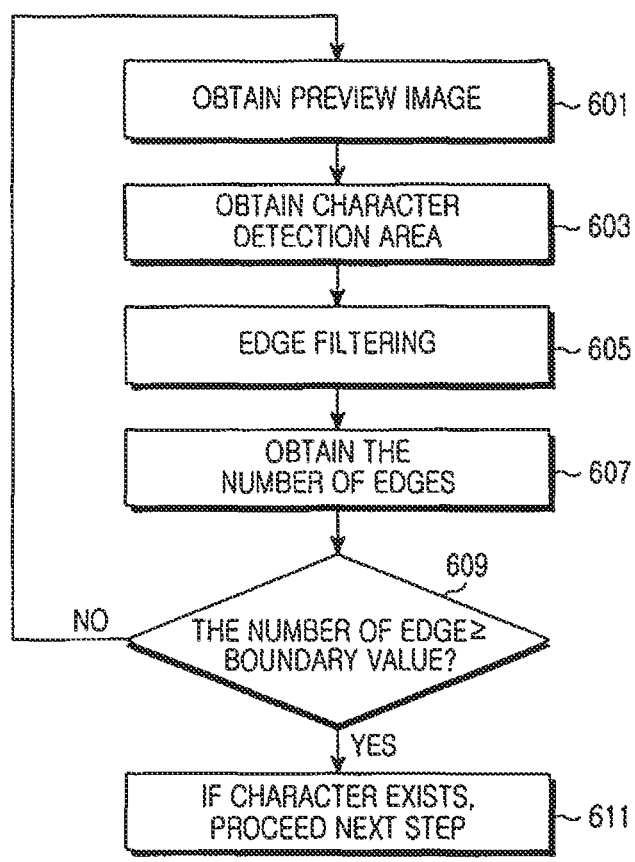
FIG. 7 is a flowchart illustrating a procedure of determining the existence of the character according to an embodiment of the present invention.

FIG. 7 illustrates an embodiment for determining the existence of the character. As the character has a recognizable size, a boundary value for determining the existence of a character can be set as the experimental value based on the size. Further, an indicator is used that represents the beginning of a character, which enables the user to easily focus the character. An area in which the number of edges is obtained is selected based on the indicator. Referring to FIG. 7, the recognition controlling unit 10 obtains the preview image in step 601, obtains a character detection area from the preview image in step 603, executes edge filtering in step 605, and calculates the number of edges in step 607. Further, if the number of edges is greater than or equal to the boundary value in step 609, it is determined that a character exists in step 611.

In order to more accurately determine movement, it is required to determine if the actually detected edge is the edge of the character or the edge of another object. However, if the subject to be recognized by the user is a document, the user moves the camera near the side of the book, so that a case where the user places the camera near the side of a document is assumed for description in the embodiment of the present invention.

Figure 8:
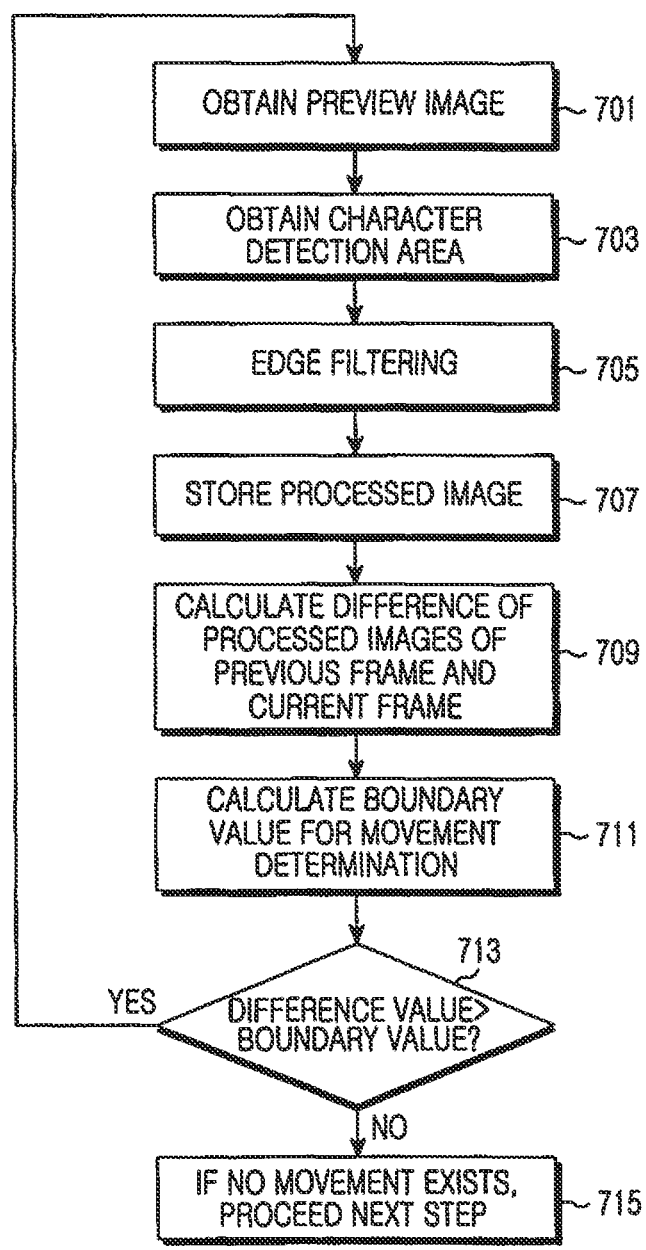
FIG. 8 is a flowchart illustrating a procedure of determining the existence of movement according to an embodiment of the present invention.

FIG. 8 illustrates a specific embodiment for determining movement. Since it is necessary to compare the current image with the previous image for determining the movement, the recognition controlling unit 10 stores previous image frames considering the appropriate performance in comparison with the calculation amount. Further, the recognition controlling unit 10 calculates the value enabling the determination of movement through comparing the stored previous image frame with the current image frame and applies the boundary value to the calculated value so as to determine the existence of movement. The boundary value can be set through reflecting an appropriate experimental value based on a variable boundary value in which a size of a character included in an area for determining the current movement is considered. It is possible to increase the number of previous image frames or reflect the history of the value for determining movement for a more accurate movement determination.

Referring to FIG. 8, the recognition controlling unit 10 obtains the preview image in step 701, obtains the character detecting area in step 703, performs edge filtering in the obtained character detecting area in step 705, and stores the filtering-processed image in step 707. The edge filtering corresponds to step 605 of FIG. 7. Then, the recognition controlling unit 10 compares the processed images between the most-current frame and its previous frame among the stored images and calculates the difference between the images in step 709 and calculates the movement determination boundary value for determining the movement in step 711. Thereafter, the recognition controlling unit 10 compares the calculated difference value with the movement determination boundary value. If the difference value is less than the movement determination boundary value, it determines that no movement exists so as to perform the next recognition procedure in step 715. If the difference value is greater than or equal to the movement determination boundary value, it determines movement has occurred.

Figure 9:
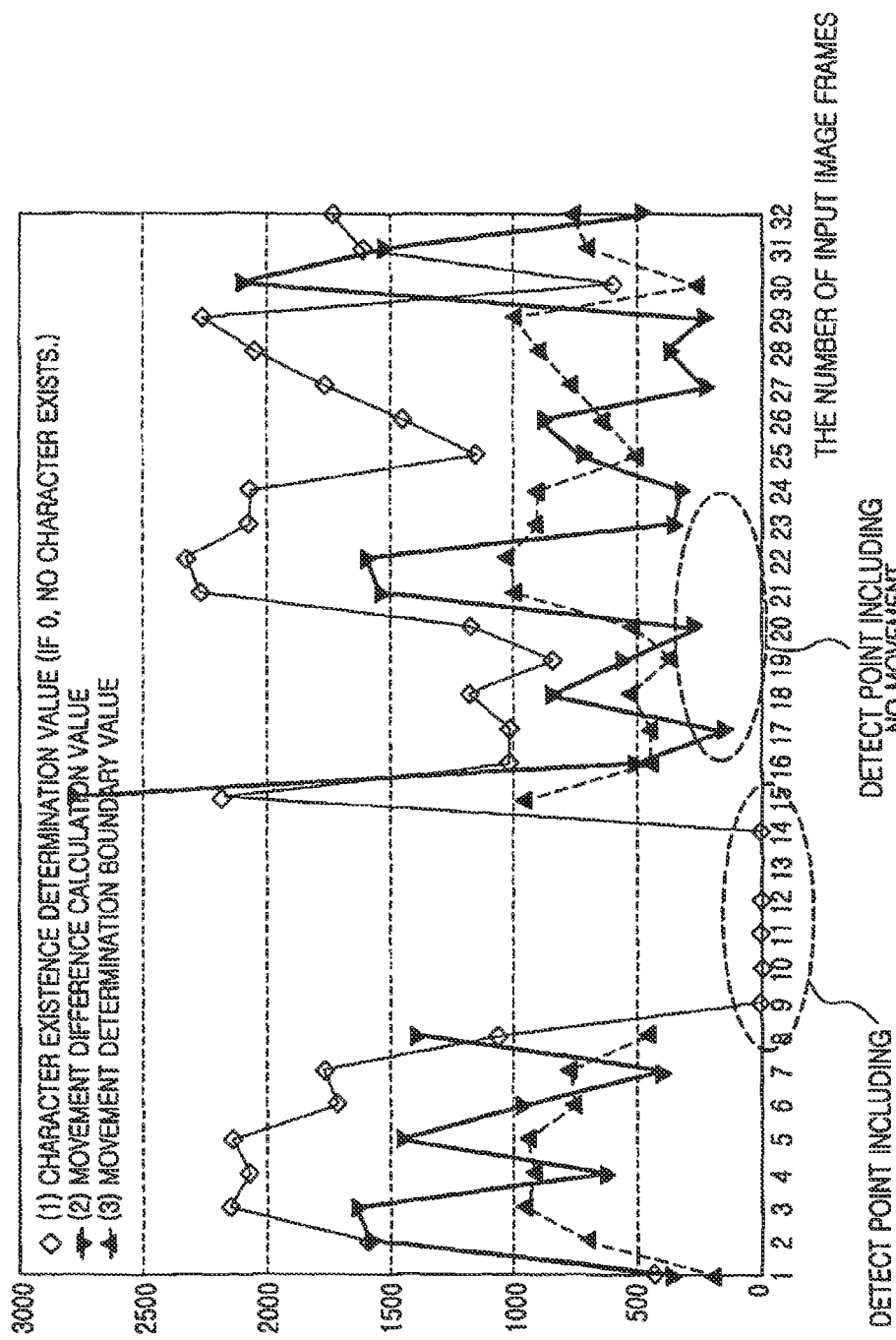
FIG. 9 is a diagram illustrating a result applied with the character detection and movement detection according to an embodiment of the present invention.

FIG. 9 illustrates a testing result of the afore-mentioned character area detection and movement detection. It is possible to determine the time point with no movement through the comparison of the movement difference calculated value and the movement determination boundary value. Further, the movement determination boundary value is calculated in proportion to the number of edges existing in the current character so that the movement determination boundary value can be more accurately changed. A character existence determination value is a value calculated for determining the existence of the character in the current image, which refers to an area having a value of 0 in a graph with no character, i.e. refers to a case where the camera is placed on a blank space around the character or the space of a document. As such, through controlling the general flow of the recognizing apparatus through the detection of the existence of the characters and movement, it is possible to recognize characters when the camera is placed on the to-be-recognized visual point or character while maintaining a real-time preview.

As such, the present invention recognizes the characters in the preview screen of the camera in real time so as to rapidly and consecutively provide the user with the recognition result. Further, the present invention has suggested the error controlling method and pre-processing method for improving the recognition rate and the post-processing method enabling an efficient dictionary search with respect to the recognized result. Through the character recognizing method of the present invention, characters can be rapidly recognized without deteriorating the recognition rate. Further, the present invention can detect the degree of the user's movement and executes the character recognizing function during movement so that unnecessary time for recognizing undesired characters are not wasted, thereby providing rapid character recognition and dictionary search.

While the invention has been shown and described with reference to certain preferred embodiments and drawings thereof, it will be understood by those skilled in the art that various changes in form and details may be made therein without departing from the spirit and scope of the invention as defined by the appended claims.

What is claimed is:

1. A method for recognizing a character in a portable device, the method comprising:
   obtaining, in accordance with a character recognition request, an image using a camera of the portable device in a preview mode in which a plurality of images are being sequentially displayed in real time on a display of the portable device;
   performing an auto focus function of the camera to obtain an image having a certain level of clarity for character recognition using the camera;
   character-recognition-processing the image having the certain level of clarity so as to generate recognition result data; and
   displaying a recognized character row on the display based on the recognition result data.

2. The method as claimed in claim 1, wherein performing the auto focus function of the camera comprises:
   performing the auto focus function when a character is identified in the image obtained in the preview mode.

3. The method as claimed in claim 2, wherein performing the auto focus function of the camera comprises:
   determining whether outlines of the identified character are as clear as the certain level of clarity;
   determining that blur is present in the image obtained in the preview mode and performing the auto focus function of the camera, when the outlines of the identified character are not as clear as the certain level of clarity.

4. The method as claimed in claim 2, wherein identifying the character in the image obtained in the preview mode comprises:

obtaining a character detection area in the image obtained in the preview mode;

performing edge filtering so as to extract a number of edges; and identifying the character, when the extracted number of edges is greater than or equal to a boundary value.

5. The method as claimed in claim 1, wherein performing the auto focus function of the camera comprises:

comparing two or more frames of the image obtained in the preview mode to determine whether movement exists; and performing the auto focus function of the camera, when no movement exists.

6. The method as claimed in claim 5, wherein determining whether the movement exists comprises:

obtaining a character detection area in the image obtained in the preview mode;

storing an edge filtering-processed image when the character is identified through edge filtering within the character detection area;

comparing a processed most current frame of the image obtained in the preview mode with a processed previous frame of the image obtained in the preview mode;

calculating a value according to a difference between the processed images;

determining that the movement does not exist, when the calculated value is less than a movement determination boundary value; and determining that the movement exists when the calculated value is greater than or equal to the movement determination boundary value.

7. The method as claimed in claim 1, further comprising:

combining one or more characters identified through the character-recognition-processing of the image obtained in the preview mode and having a predetermined maximum number of characters as a first word;

searching a dictionary database that stores dictionary information on various languages using the first word; and outputting a word corresponding to the first word in at least one of the various languages according to a result of the search of the dictionary database using the first word.

8. The method as claimed in claim 7, further comprising excluding characters from the first word one by one;

identifying new words from characters remaining in the first word after excluding characters from the first word;

searching the dictionary database using the respective new words; and outputting words corresponding to the respective new words according to a result of the search of the dictionary database using the respective new words.

9. The method as claimed in claim 7, further comprising searching the dictionary database using a selected word having one or more characters selected by the user from the first word, or selected by the user from the one or more characters identified through the character-recognition-processing; and outputting a word corresponding to the selected word according to a result of a search of the dictionary database using the selected word.

10. The method as claimed in claim 1, further comprising:

identifying a first word from one or more characters identified through the character recognition; and outputting a word that corresponds to the first word and is in a language other than a language other than a language of the first word.

11. A character recognizing apparatus in a portable device, the character recognizing apparatus comprising:

a camera;

a display unit for displaying an image obtained, in accordance with a character recognition request, using the camera in a preview mode in which a plurality of images are being sequentially displayed in real time; and a recognition controlling unit for controlling display of the image obtained in the preview mode, performing an auto focus function of the camera to obtain an image having a certain level of clarity for character recognition using the camera, character-recognition-processing the image having the certain level of clarity so as to generate recognition result data, and controlling display of a recognized character row on the display unit based on the recognition result data.

12. The method as claimed in claim 11, wherein the recognition controlling unit determines whether outlines of the identified character are as clear as the certain level of clarity and determines that blur is present in the image obtained in the preview mode and performs the auto focus function of the camera, when the outlines of the identified character are not as clear as the certain level of clarity.

13. The character recognizing apparatus as claimed in claim 11, wherein the recognition controlling unit performs the auto focus function of the camera a character is identified in the image obtained in the preview mode.

14. The character recognizing apparatus as claimed in claim 13, wherein the recognition controlling unit, in identifying the character in the image obtained in the preview mode, obtains a character detection area in the image obtained in the preview mode, performs edge filtering so as to extract the number of edges, and identifies the character when the extracted number of edges is greater than or equal to a boundary value.

15. The character recognizing apparatus as claimed in claim 11, wherein, in performing the auto focus function of the camera, the recognition controlling unit compares two or more frames of the image obtained in the preview mode to determine whether movement exists, and performs the auto focus function of the camera when no movement exists.

16. The character recognizing apparatus as claimed in claim 15, wherein the recognition controlling unit, in determining whether the movement exists, obtains a character detection area in the image obtained in the preview mode, stores an edge filtering processed image when the character is identified through edge filtering within the character detection area, compares a processed most-current frame of the image obtained in the preview mode with a processed previous frame of the image obtained in the preview mode, calculates a value according to a difference between the processed images, determines that the movement does not exist when the calculated value is less than a movement determination boundary value, and determines that the movement exists when the calculated value is greater than or equal to the movement determination boundary value.

17. The character recognizing apparatus as claimed in claim 15, wherein the recognition controlling unit combines one or more characters identified through the character-recognition-processing of the image obtained in the preview mode and having a predetermined maximum number of characters as a first word, searches a dictionary database that stores dictionary information on various languages using the first word, and outputs a word corresponding to the first word in at least one of the various languages according to a result of the search of the dictionary database using the first word.

18. The character recognizing apparatus as claimed in claim 17, wherein the recognition controlling unit excludes characters from the first word one by one and identifies new words from characters remaining in the first word after excluding characters from the first word, searches the dictionary database using the respective new words, and outputs words corresponding to the respective new words according to a result of the search of the dictionary database using the respective new words.

19. The character recognizing apparatus as claimed in claim 18, wherein the recognition controlling unit searches the dictionary database using a selected word having one or more characters selected by the user from the one or more characters identified through the character-recognition-processing; and outputs a word corresponding to the selected word according to a result of a search of the dictionary database using the selected word.

20. The character recognizing apparatus as claimed in claim 11, wherein the recognition controlling unit identifies a first word from one or more characters identified through the character recognition, and outputs a word that corresponds to the first word and is in a language other than a language other than a language of the first word.

* * * * *